US012687053B2

(12) United States Patent
Pascoe et al.

(10) Patent No.: US 12,687,053 B2
(45) Date of Patent: Jul. 21, 2026

(54) HYBRID ELECTRONIC/MECHANICAL RELEASE HANDLE FOR A VEHICLE INTERIOR

(71) Applicant: International Automotive Components Group GmbH, Düsseldorf (DE)

(72) Inventors: David Mark Pascoe, Aurora (CA); Sung-uk Kim, Grafing (DE); Carter Scott Cannon, Munich (DE)

(73) Assignee: International Automotive Components Group GmbH, Dusseldorf (DE)

( * ) Notice: Subject to any disclaimer, the term of this patent is extended or adjusted under 35 U.S.C. 154(b) by 63 days.

(21) Appl. No.: 18/546,617

(22) PCT Filed: May 4, 2022

(86) PCT No.: PCT/EP2022/062057
§ 371 (c)(1),
(2) Date: Aug. 16, 2023

(87) PCT Pub. No.: WO2022/233978
PCT Pub. Date: Nov. 10, 2022

(65) Prior Publication Data

US 2024/0301731 A1 Sep. 12, 2024

Related U.S. Application Data

(60) Provisional application No. 63/183,917, filed on May 4, 2021.

(51) Int. Cl.
*E05B 85/12* (2014.01)
*E05B 81/76* (2014.01)
(Continued)

(52) U.S. Cl.
CPC .............. *E05B 85/12* (2013.01); *E05B 81/77* (2013.01); *E05B 81/90* (2013.01); *E05F 15/42* (2015.01);
(Continued)

(58) Field of Classification Search
CPC .......... E05B 85/12; E05B 81/77; E05B 81/90; E05F 15/42; E05F 2015/483; E05Y 2201/68; E05Y 2900/531
(Continued)

(56) References Cited

U.S. PATENT DOCUMENTS 10,633,895 B1 * 4/2020 Salter ........................ F21V 9/32
11,214,194 B2 * 1/2022 Thorngren .............. E05B 85/10
(Continued)

FOREIGN PATENT DOCUMENTS

DE 212017000318 U1 10/2019
EP 1707716 A2 * 10/2006 ............. E05B 81/78
(Continued)

OTHER PUBLICATIONS

International Search Report and Written Opinion of International Application No. PCT/EP2022/062057, mail date Sep. 13, 2022, 14 pages.

*Primary Examiner* — Kristina R Fulton
*Assistant Examiner* — James Edward Ignaczewski
(74) *Attorney, Agent, or Firm* — Secant IP, PLLC

(57) ABSTRACT

Disclosed herein is a hybrid electronic/mechanical release handle for positioning on the interior of a vehicle door panel comprising a bezel cup carrier containing an electronic sensor and mechanical handle, wherein said bezel cup carrier defines an opening for insertion of one or a plurality of a user's fingers into the bezel cup where the electronic sensor is mechanically engaged to the bezel cup carrier and covered by at least a portion of the mechanical handle.

7 Claims, 13 Drawing Sheets

(51) Int. Cl.
*E05B 81/90* (2014.01)
*E05F 15/42* (2015.01)

(52) U.S. Cl.
CPC ..... *E05F 2015/483* (2015.01); *E05Y 2201/68* (2013.01); *E05Y 2900/531* (2013.01)

(58) Field of Classification Search
USPC ........................................................ 292/336.3
See application file for complete search history.

(56) References Cited

U.S. PATENT DOCUMENTS

| | | | | |
|---|---|---|---|---|
| 2010/0264940 | A1* | 10/2010 | Tsuchida | H03K 17/962 340/5.6 |
| 2020/0130646 | A1* | 4/2020 | Peterson | E05B 17/10 |
| 2021/0332619 | A1* | 10/2021 | Peterson | B60R 25/2045 |
| 2022/0259914 | A1* | 8/2022 | Tsukao | E05F 15/73 |
| 2023/0003058 | A1* | 1/2023 | Blank | E05B 85/10 |
| 2023/0135008 | A1* | 5/2023 | Schatz | E05B 85/10 340/5.72 |

FOREIGN PATENT DOCUMENTS

| | | | | |
|---|---|---|---|---|
| WO | WO-2018165925 A1 * | 9/2018 | | B60Q 9/00 |
| WO | WO-2023156146 A1 * | 8/2023 | | E05B 41/00 |

* cited by examiner

HYBRID ELECTRONIC/MECHANICAL RELEASE HANDLE FOR A VEHICLE INTERIOR

FIELD

The present invention is directed at a hybrid electronic/mechanical release handle for a vehicle interior that may be applied to a vehicle door. The hybrid configuration allows the vehicle occupant a choice of mechanical release, touch release, or even touchless release, optionally with additional functionality, such as warning an occupant of exterior obstacles that may interfere with door opening.

BACKGROUND

Vehicle doors generally include a mechanical latch on the interior of the vehicle for releasably opening to door from the closed position. The latch assembly typically includes a striker mounted to the door frame, a latch mounted to the movable door and a handle mounted to the door that is movable by the user to actuate the latch to disengage the striker. The latch assembly also typically includes mechanical linkages connecting the handle to the latch.

Electronic release latch assemblies have also been reported. However, an on-going need remains to provide electronic latch assemblies that allow the vehicle occupant to readily select as between mechanical release and electronic release, where the electronic release may include touch or touchless type release options. In addition, there remains a need for an interior vehicle handle where the mechanical latch assembly and electronic latch assembly are configured such that the two assemblies may be configured into a single module containing the mechanical/electronic features. Furthermore, there is a need to provide a hybrid electronic/mechanical release handle for a vehicle interior that would warn the occupants and prevent opening of the vehicle door when there are exterior obstacles in the pathway of the door to be opened and/or that would warn the occupant from opening a door in the event of detected vehicle motion.

DETAILED DESCRIPTION OF PREFERRED EMBODIMENTS

Figure 1:
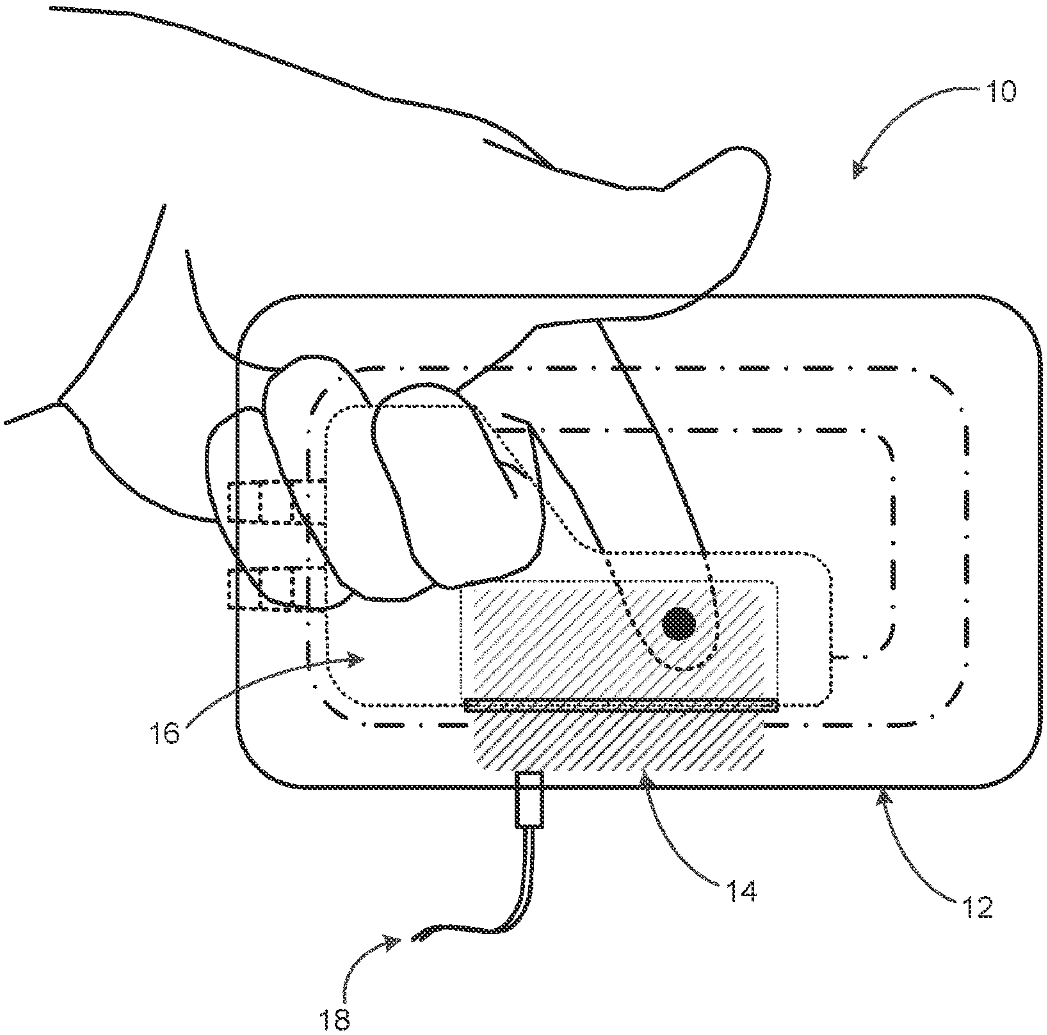
FIG. 1 provides a perspective view of one embodiment of a hybrid mechanical/electronic interior door assembly.

FIG. 1 provides a perspective cut-away view of hybrid mechanical/electronic interior door assembly 10 providing mechanical release and/or electronic release for opening an interior vehicle door. A user may insert their hand into the bezel/cup carrier 12 and engage the electronic sensor 14 that is preferably nested into a portion of the mechanical handle 16. The sensor may optionally be integrated into the bezel cup carrier 12 or even into the trim component panel 17 (see FIG. 2). In this illustrated embodiment, the electronic sensor 14 may respond when a user's finger touches the electronic sensor or when the user's finger is in proximity to the sensor which includes an electrical connector 18 that connects to the door wiring harness to provide for electronic vehicle door opening. As may also be appreciated, the mechanical handle may preferably be of an L-shaped or any desired handle shaped configuration which then defines an opening in the bezel-cup carrier for insertion of a user's finger into such opening to engage the sensor. Reference to a bezel cup carrier may be understood as a hollowed-out structure that may be cup-shaped with an opening on one side and which can be readily positioned within an interior door trim panel.

Figure 2:
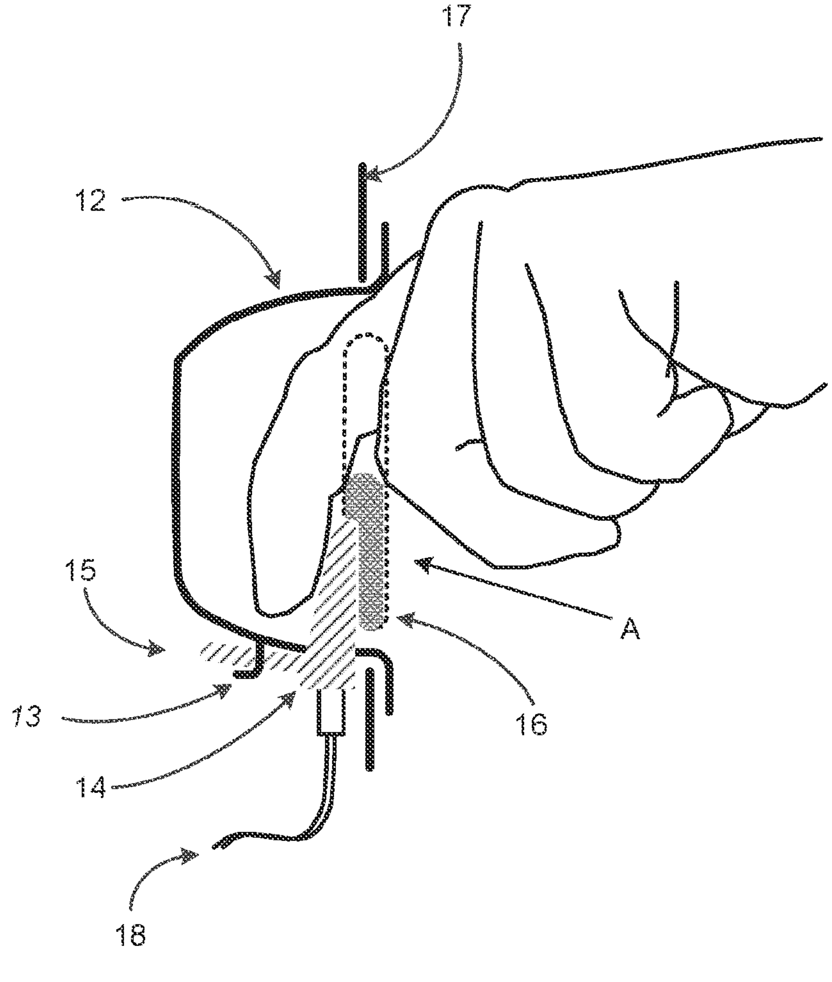
FIG. 2 provides a cross-sectional view of the assembly in FIG. 1.

FIG. 2 provides a cross-sectional view of the assembly 10 of FIG. 1. As can be observed, the electronic sensor 14 is preferably configured so that a portion of such sensor may nest within a portion of handle 16, such as in a recess. The sensor 14 may also be integrally molded into the bezel/cup carrier and the bezel cup carrier itself, as noted herein, may be integrally formed with the trim panel 17. In addition, the electronic sensor may be conveniently inserted into the lower portion of the bezel/cup carrier 12 and then include an extended portion 15 that projects from the sensor 14 that is configured to mechanically engage with a lower portion 13 of the carrier 12. In this manner, the sensor is preferably immobilized via such mechanical engagement and it also is protected from any sort of impact by its location within the bezel/cup carrier 12. In other words, the electronic sensor is mechanically engaged to the bezel cup carrier and covered from the interior of the vehicle by at least a portion of the mechanical handle.

Although FIG. 2 illustrates the user's finger within the bezel cup carrier 12, touching or in engagement with the electronic sensor 14 to trigger electronic door opening, it should be noted that this is only a preferred form of engagement. The electronic sensor 14 may also provide for proximity sensing, in which case the user would not need to insert a finger into the bezel cup carrier and may simply approach the sensor 14 at any location in the general vicinity of the handle 16 to trigger electronic release. In the broad context of the present invention, sensor 14 may therefore be a proximity sensor and detect the presence of a user's hand/finger, for example, at any location within 50.0 mm or less from the sensor, such as in the range of 0.1 mm to 50.0 mm, more preferably in the range of 0.1 mm to 25.0 mm, or even more preferably, in the range of 0.1 mm to 10.0 mm. Accordingly, it is worth emphasizing the proximity sensor is one that can detect the presence of a user's hand and/or fingers at location "A" in FIG. 2, and in particular, on the other side of the handle 16 opposite the physical location of sensor 14. In addition, the sensor may preferably comprise a capacitive touch sensor. The sensor may therefore, e.g., detect the gesture of a user's hand at such locations proximate the handle 16 and/or bezel cup carrier 12 to trigger electronic release of the door.

It should also be noted that while the bezel cup carrier 12 is shown as a separate component relative to the interior trim panel 17, the bezel cup carrier and interior trim panel are contemplated to be in the form of single, unitary trim panel, where the bezel cup carrier may be integrally formed and then become integral with the trim panel 17.

Figure 3:
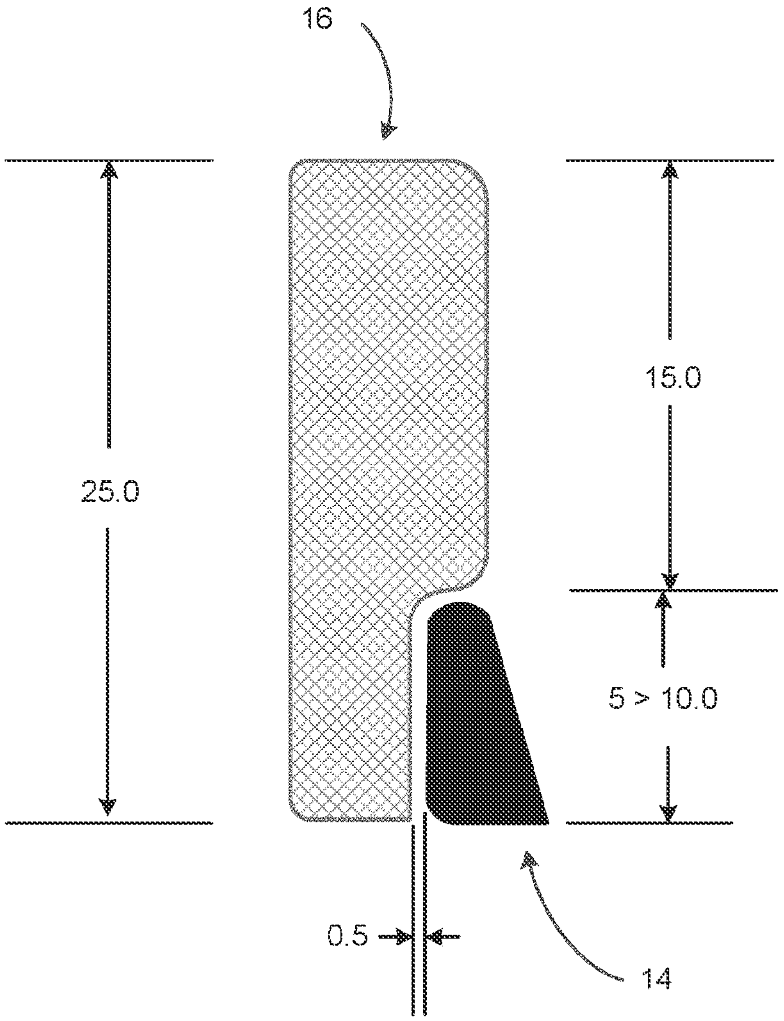
FIG. 3 provides another perspective view of the handle and sensor with some preferred dimensions in millimeters for the identified components.

FIG. 3 provides another perspective view of the handle 16 and electronic sensor 14, along with some preferred dimensions for the identified components. The handle 16 may have a preferred length of up to 25.0 mm, or in the range of 10.0 mm to 25.0 mm. The sensor 14 may have a preferred length of up to 10.0 mm, or in the range of 5.0 mm to 10.0 mm. As alluded to above, and as illustrated in FIG. 2, the electronic sensor is again shown as preferably nested into a portion of the handle 16. Reference to nesting should be understood as indicating that all or a portion of the sensor 14 is positioned within a recess in the handle 16. Moreover, it should be noted that movement of the handle 16, to mechanically open the vehicle door, is such that it may occur without displacement of movement of the sensor 14.

Some additional aspects of the hybrid mechanical/electronic interior door assembly 10 are now worth mentioning, and may include the following: (1) as noted, the sensor 14 is one that may be selected from various sensor types, such as a force sensor and/or touch sensor such as a capacitive sensor and/or proximity sensor; (2) the door release can be programmed and pre-selected by the occupant such that the vehicle door opens when the occupant engages with the sensor, such as touching the sensor, or the sensor may be disabled, limiting the hybrid electronic/mechanical released handle to mechanical door opening; (3) the handle 16 may be constructed in a variety geometric shapes and designs depending upon a particular vehicle's requirements; (4) the sensor 14 may be constructed as a separate stand-alone sensor module to then be integrated into the door assembly 10; (5) the sensor may be integrated with other detection sensors, such as exterior object detectors and in particular blind-spot detectors, to provide a warning to an occupant that door-opening may lead to object impact; (6) the door assembly 10 may also include other components, such as LED lighting, which may be triggered to provide different color outputs depending upon: (a) vehicle motion or no motion; (b) the opening or closing status of the vehicle door; and/or (c) the aforementioned warning based upon the presence or absence of an object that would impede opening of the vehicle door.

In addition, the hybrid mechanical/electronic interior door assembly may preferably include the feature that if the occupant programs the door release mechanism to be responsive to the sensor 14, displacement or movement of the mechanical handle can be configured such that it may then override such instructions. That is, it is contemplated that the mechanical handle 18 is capable of displacement and when rotationally engaged with the door opening mechanical linkage, the handle may undergo a rotational movement from a closed position towards a full open position. When the handle is therefore, e.g., pulled upon by the occupant to then interact with the door mechanical linkages and open the door, the handle may itself be programmed such that upon rotation of 200 or more, such as in the range of 20° to 90°, the electronic sensor 14 is then fully disengaged. It may be appreciated that such operation may be relied upon by the occupant in case of an emergency and/or when the electronic sensor malfunction.

Figure 4:
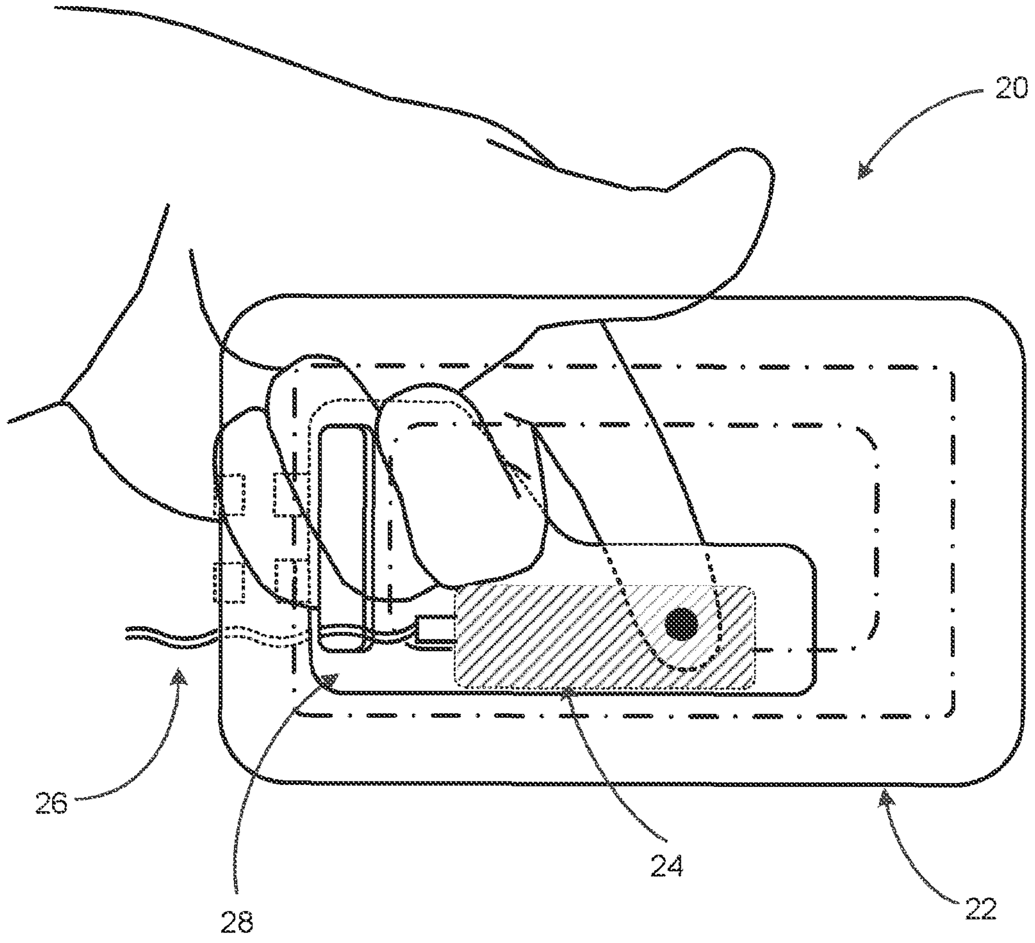
FIG. 4 provides a perspective view of another embodiment of a hybrid mechanical/electronic interior door assembly.
Figure 5:
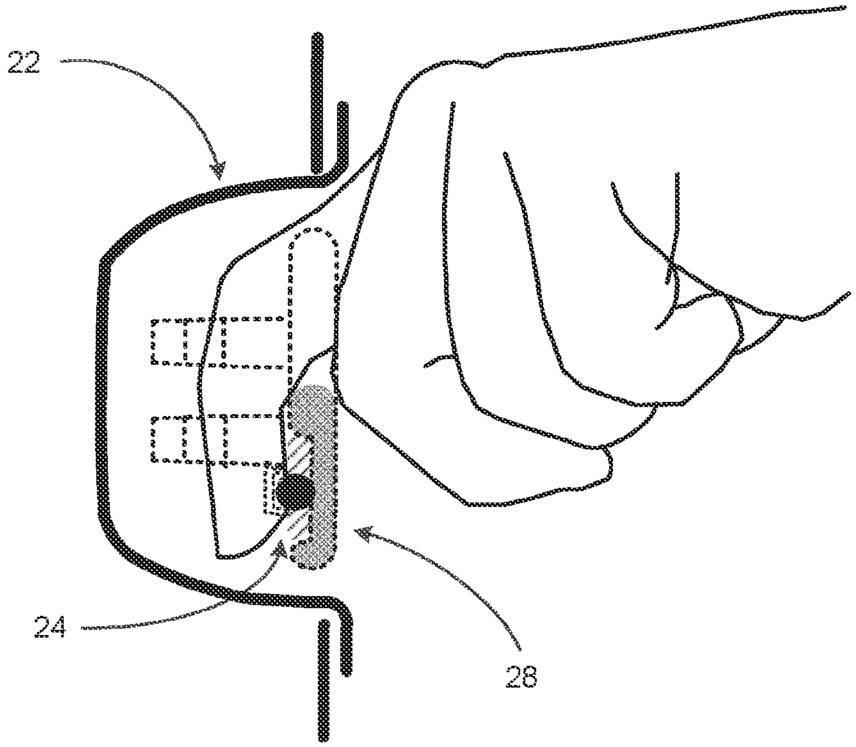
FIG. 5 provides a cross-sectional view of the assembly of FIG. 4.

Other configurations for the hybrid mechanical/electronic interior door assembly are illustrated in FIG. 4 which shows a cut-away perspective view of assembly 20 that again includes a bezel/cup carrier 22, sensor 24, electrical connector 26 and handle 28. A cut-away cross-sectional view of FIG. 4 is provided in FIG. 5. As can be seen in FIG. 5, the sensor 24 may be positioned within a U-shaped recess or cutout in the handle 28. In this embodiment, as in the embodiments described above, the sensor 24 may be provided as a separate module and can include a force sensor, touch sensor, capacitive sensor, or proximity sensor, with the same operating features. Again, the physical placement of the sensor is such that it is protected from an undesirable impact by its location within the bezel/cup carrier 22.

Figure 6:
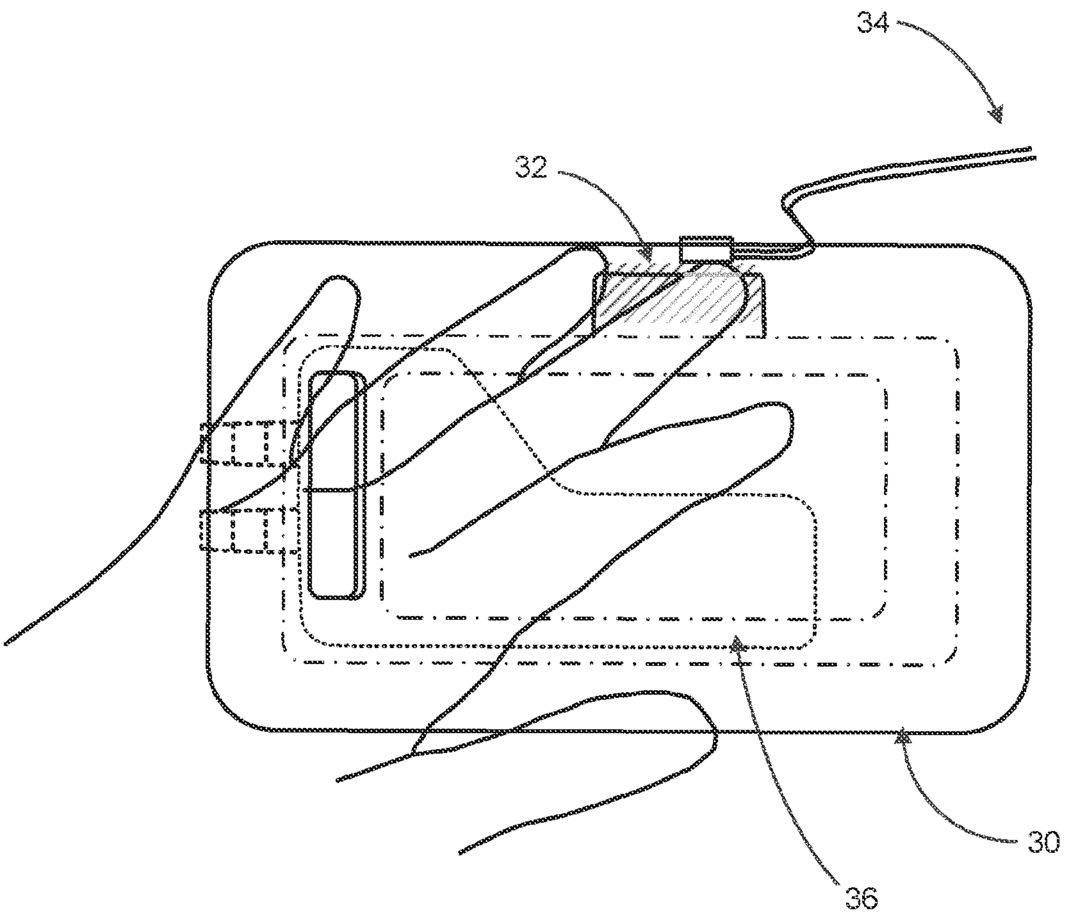
FIG. 6 provides a perspective view of yet another embodiment of a hybrid mechanical/electronic interior door assembly.

Still yet another embodiment of the hybrid mechanical/electronic sensor herein is illustrated in FIG. 6. The bezel cup carrier can be seen at 30, the electronic sensor at 32, the electrical connector at 34 and the handle at 36. A cut away cross-section view of FIG. 6 is provided in FIG. 7. In this embodiment, the sensor 32 is preferably positioned at one open portion of the of the bezel cup carrier, and as shown at the top portion and preferably above the handle 31. Accordingly, in this embodiment, the bezel cup 30 includes an opening and the sensor 32 is conveniently inserted into the bezel opening as illustrated. The sensor in FIG. 7 may then preferably be a proximity sensor which then, as programmed by the occupant, can be configured to detect one or more of the user's fingers, that may be inserted into the cup carrier, to trigger an opening of the vehicle door. It should be appreciated that such touchless operation may be more preferred for car/ride share scenarios and in public transport vehicles (taxis, vans, shuttles) wherein occupants may prefer not to touch or come into contact with shared surfaces.

Figure 7A:
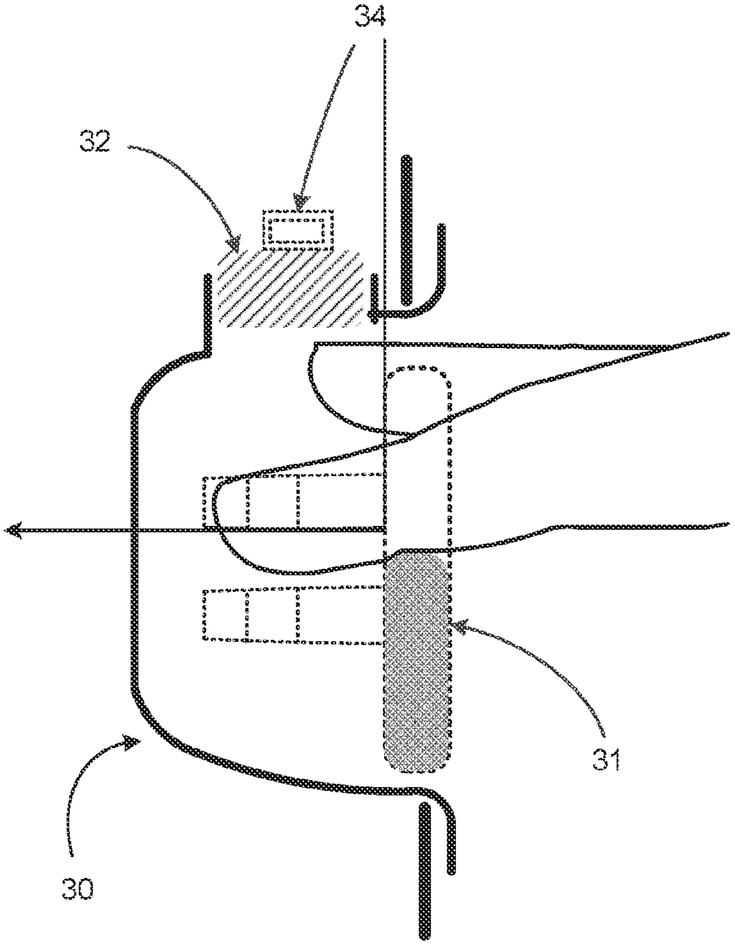
FIG. 7 provides a cross-sectional view of the assembly of FIG. 6.
FIG. 7B provides another perspective view of another embodiment of a hybrid mechanical/electronic door assembly.
FIG. 7C provides a cross-sectional view of the assembly of FIG. 7B.
FIG. 7D provides another perspective view of another embodiment of a hybrid mechanical/electronic door assembly.
FIG. 7E provides a cross-sectional view of the assembly of FIG. 7D.
Figure 7B:
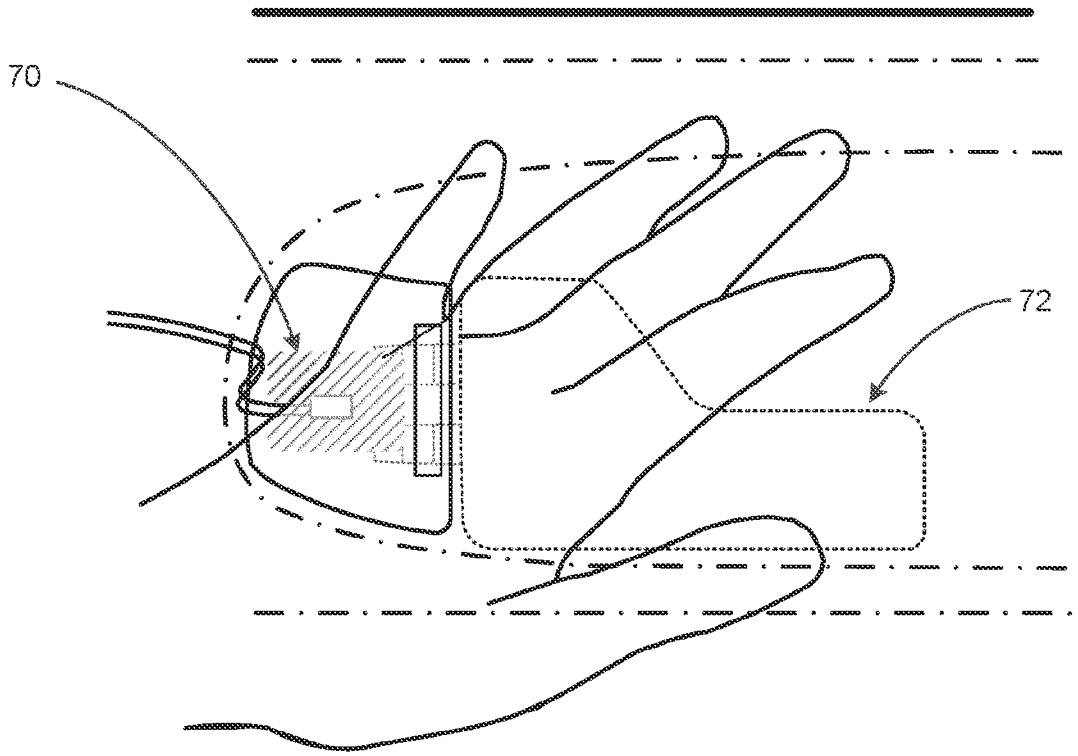
Figure 7C:
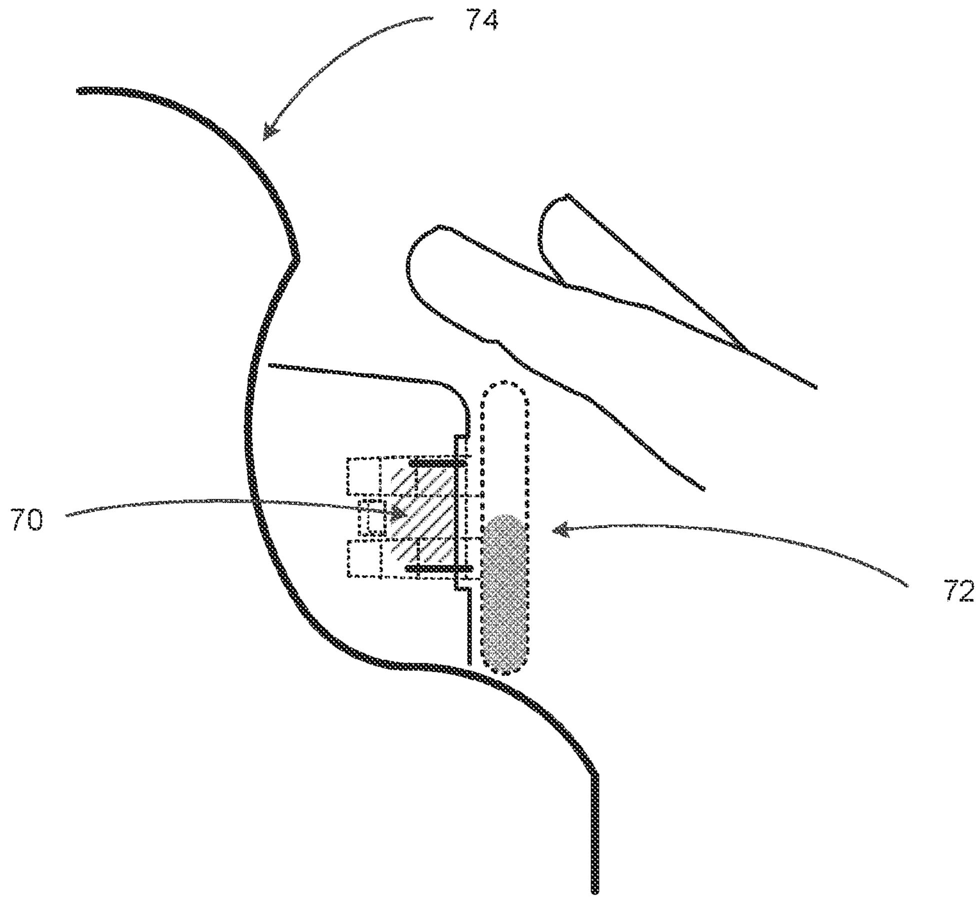

Reference is next made to FIG. 7B which illustrates another embodiment for the hybrid electronic/mechanical release handle herein, along with a cross-sectional view in FIG. 7C. The electronic sensor is observed at 70 and the mechanical release is at 72 and the trim panel at 74. As illustrated in FIGS. 7A and 7B, the hybrid electronic/mechanical release handle herein is such that the it also serves as a close-out trim for the interior trim door panel 74.

Figure 7D:
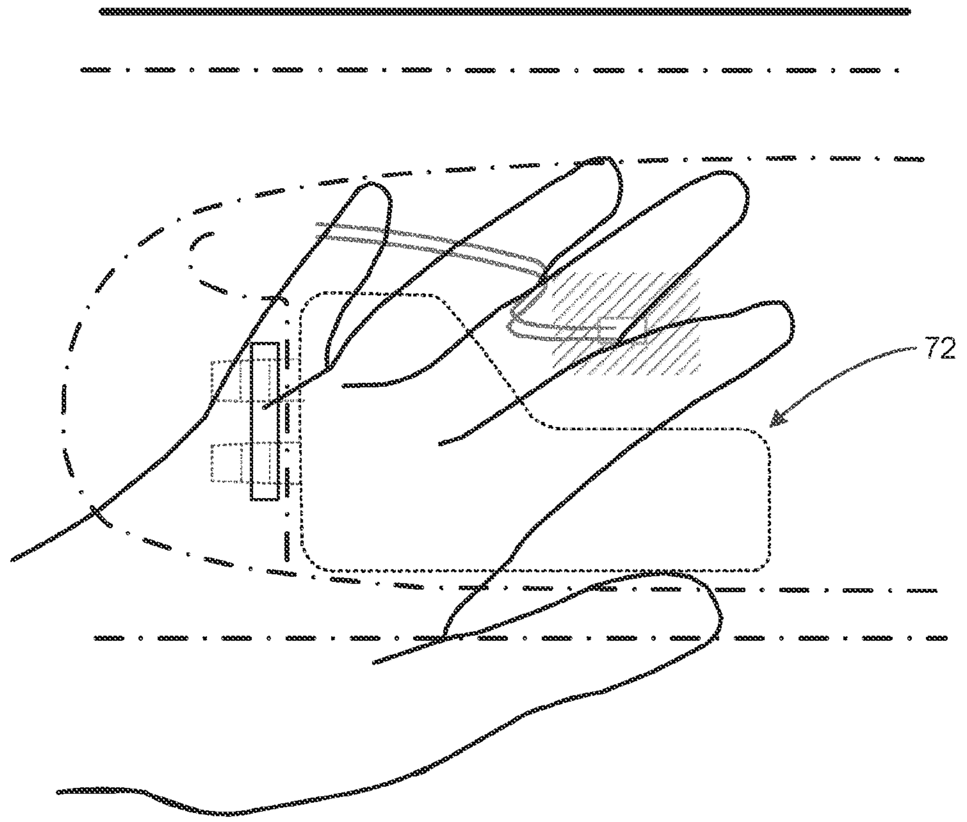
Figure 7E:
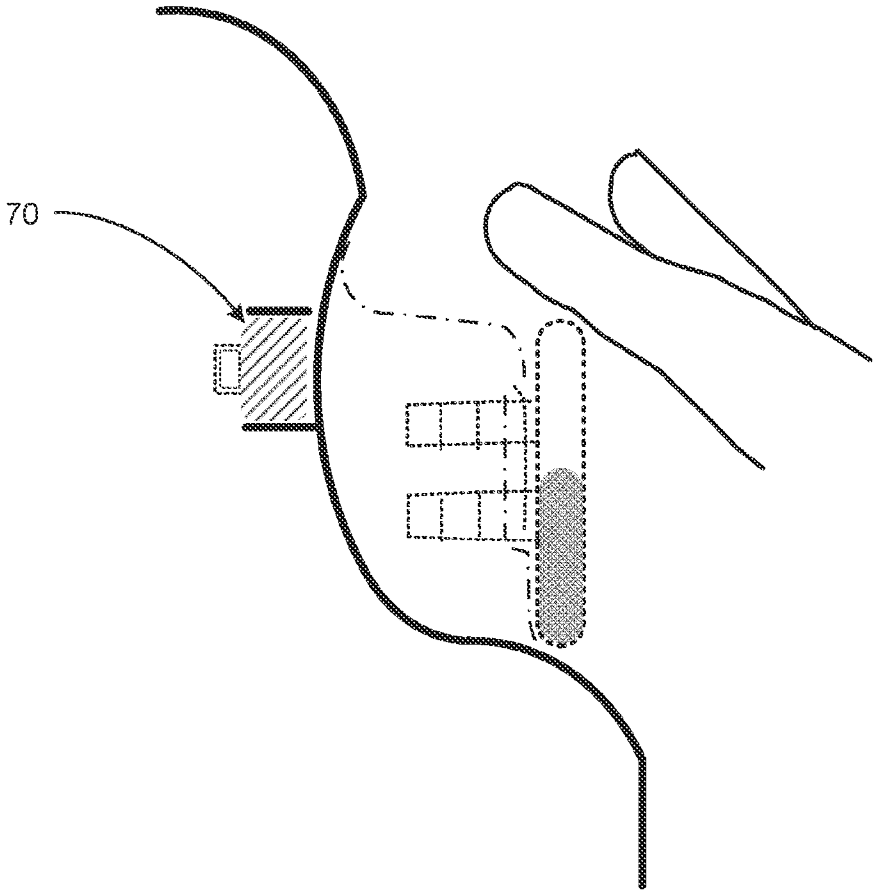

Reference is also made to FIG. 7D which illustrates a still further embodiment of the hybrid electronic/mechanical release handle herein, along with a cross-sectional view in FIG. 7E. The mechanical release assembly is again illustrated at 72. The sensor 70 in this embodiment may be mounted, as illustrated, on the opposite side of the trim panel or bezel cup carrier while still providing proximity sensor detection in response to the presence of a user's fingers.

In all of the above embodiments, the hybrid electronic/mechanical release handle within the vehicle interior is one that allows the occupant a choice of mechanical release, touch release and/or touchless release of the vehicle door. With attention now to FIGS. 8A and 8B, the hybrid system herein also offers other useful functional operational capabilities within the vehicle with respect to an occupant's decision to open the vehicle door.

Figure 8A:
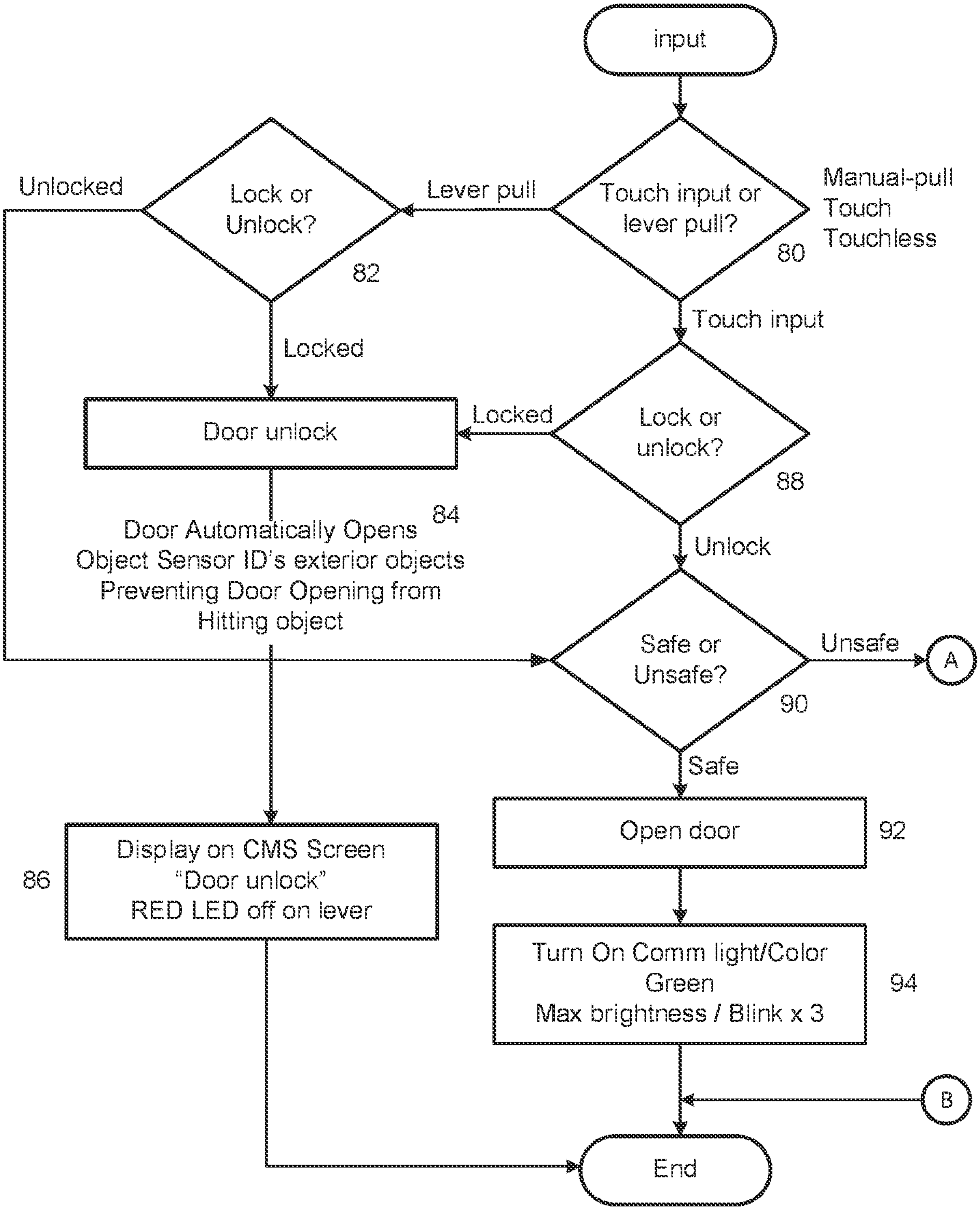
FIGS. 8A and 8B provide a functional flow chart illustrating the operation of the hybrid mechanical/electronic interior door assembly herein.

Initially, at 80 in FIG. 8A a user may input to a vehicle controller (e.g. electronic touch screen showing vehicle status and operation) a command to either provide for touch input, touchless input, or mechanical level pull with regards to the hybrid electronic/mechanical release assembly herein.

In the event that a user elects mechanical operation or lever pull, and then pulls on the lever, the controller may then evaluate at 82 whether the door is in a locked or unlocked state. If the door is in an unlocked state, the door will then open at 84, subject to a warning signal if the optional object sensor detects an unsafe condition. That is, the vehicle herein is also preferably equipped with detection sensors, and in particular blind spot detection sensors, such that if an object is sensed in the pathway of the door that will be opened, the occupant will be alerted to this unsafe condition. Such warning can be provided by the LED lighting noted above, where a "red" light emanates from the hybrid electronic/mechanical release handle module. The user may then choose to override such warning and at 86 open the vehicle door. The red warning light would then proceed into an off position.

If the vehicle occupant elects, e.g., touch operation, once again, upon touch by the vehicle occupant, the vehicle controller will again evaluate at 88 whether the door is in a locked or unlocked configuration. If the door is locked the vehicle controller will again unlock the door and again similarly evaluate whether or not there are any obstacles to restrict door opening. Accordingly, the vehicle controller can make a determination at 90 as to whether or not there is a "safe or unsafe" condition for vehicle door opening. As noted, the vehicle will include exterior detection sensors and/or blindspot detectors that are in communication with a vehicle controller. The vehicle controller also can evaluate whether or not the vehicle is moving, which is another example of vehicle "safe or unsafe" condition that is relevant to door opening and which can now be brought to the attention of the occupant.

By way of example, if the vehicle controller determines that: (1) there are no obstacles blocking the opening of the vehicle door; and (2) the vehicle is not moving, the activated electronic sensor will then result in opening of the door latch at 92. The vehicle controller can also now provide a green light at 94 to the LED lights disposed in the hybrid electronic/mechanical release handle to confirm the safe condition noted above.

Figure 8B:
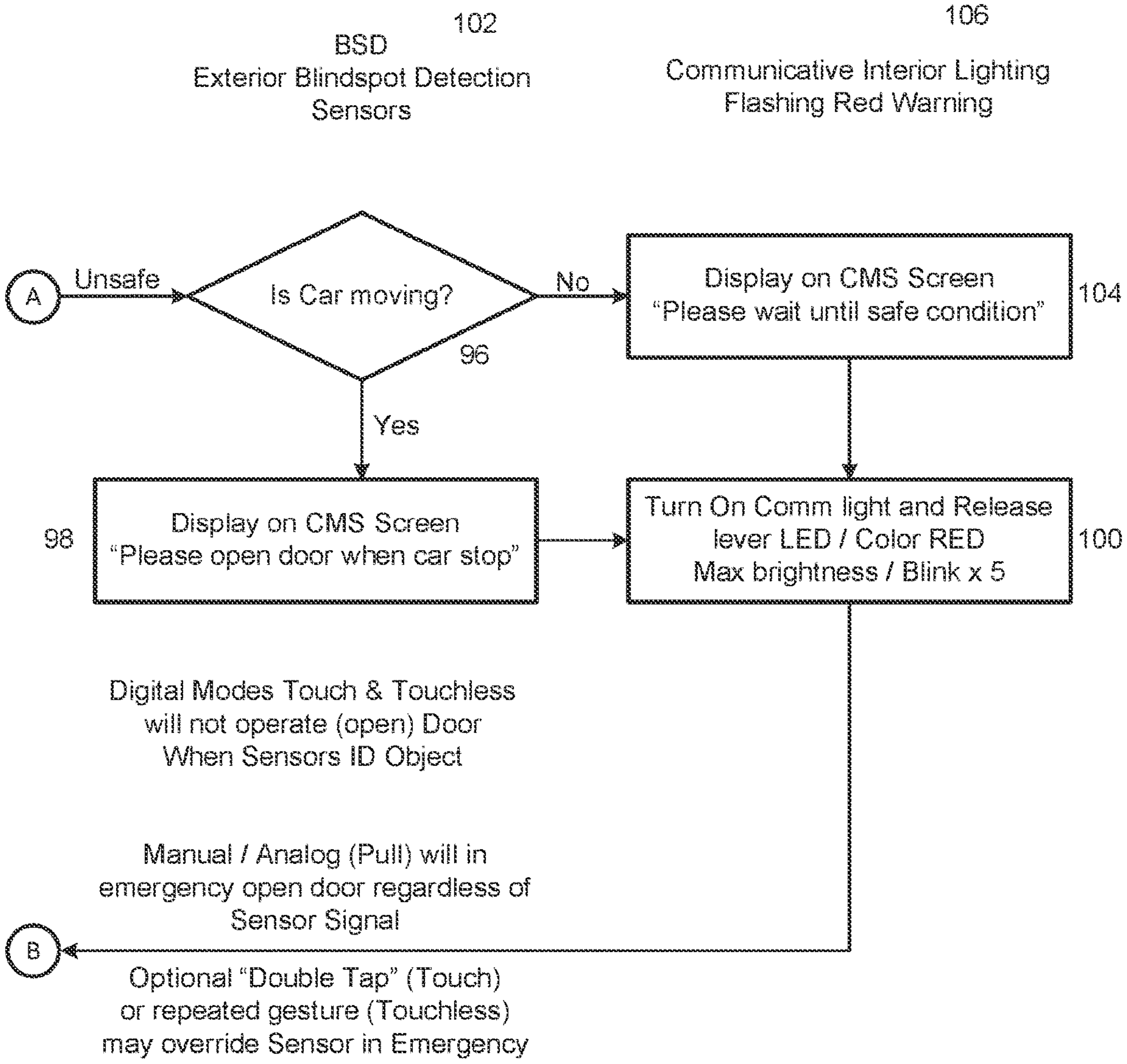

Alternatively, as shown in FIG. 8B, upon command to open the door, and if the vehicle controller determines that the vehicle is moving at 96, the vehicle controller at 98 can display on an interior vehicle screen the message "Please Open Door When Car Stop." The vehicle controller can then at 100 activate a red LED light within the electronic/mechanical release handle or a red light positioned on the surrounding door surface. Alternatively, if the vehicle controller determines that the car is not moving, the vehicle controller may then also consider whether or not external objects are positioned that would interfere with the door opening, such as through the use of blind spot detection sensors 102. If it is then determined that in the non-moving vehicle, there are objects in the pathway of a door to be opened, the vehicle controller can at 104 display on the vehicle status screen the message "Please Wait Until Safe Condition" along with a communicative flashing red warning light 106. In addition, the vehicle controller at 100 can also turn on a red LED light within the hybrid electronic/mechanical release handle.

It should be noted that the above referenced operation for vehicle door opening via use of the hybrid electronic/mechanical release handle will include other safety overrides. For example, the hybrid electronic/mechanical release handle will include a manual override that would allow the vehicle occupant, in any scenario, to open the vehicle door regardless of the status reported by the vehicle controller, such as the vehicle being in a moving condition, or the blind spot detectors reporting that there is an object in the opening pathway of the vehicle door. In addition, the electronic sensor in the hybrid electronic/mechanical release handle can itself include an override condition, such as responding to a double sequential touch by the occupant, or some other programmed touch pattern, which would then again override the vehicle system controller in an emergency and allow for door opening.

In method form, it may now also be appreciated that the present invention provides a method of operation of a vehicle door handle. The method includes providing a programmable, hybrid electronic/mechanical release handle for a vehicle interior. The sensor is configured to detect force, touch and/or the proximity of an occupant's hand or fingers to generate an opening signal that is forwarded to the door release system to implement door opening.

What is claimed is:

1. A hybrid electronic/mechanical release handle for positioning on the interior of a vehicle door panel comprising:

a bezel cup carrier containing an electronic sensor and mechanical handle, wherein said bezel cup carrier defines an opening for insertion of one or a plurality of a user's fingers into the bezel cup where the electronic sensor is mechanically engaged to the bezel cup carrier and covered by at least a portion of the mechanical handle; and lighting to provide different color outputs as a function of: (a) vehicle motion or no vehicle motion; or (b) presence or absence of objects that would impede opening of the vehicle door, wherein the lighting is triggered by user engagement with either the electronic sensor or the mechanical handle;

wherein the hybrid electronic/mechanical release handle is configured to allow a user to preselect one option from among the following:

programming the vehicle door to open when the user engages with the electronic sensor, except when the electronic sensor is disengaged upon the user rotating the mechanical handle in the range of 20° to 90°; and disabling the electronic sensor thereby limiting the hybrid electronic/mechanical release handle to only allow mechanical opening of the vehicle door.

2. The hybrid electronic/mechanical handle of claim 1 wherein said sensor is selected from a force sensor, touch sensor or proximity sensor.

3. The hybrid electronic/mechanical handle of claim 1, wherein said release handle includes a recess and said electronic sensor is positioned in said recess.

4. The hybrid electronic/mechanical handle of claim 1, further including one or more object sensors which communicate with said hybrid electronic/mechanical release handle wherein said object sensors are configured to detect objects that would impede opening of said vehicle door.

5. A hybrid electronic/mechanical release handle for positioning on the interior of a vehicle door panel comprising:

a bezel cup carrier having an opening including an electronic sensor in said opening and including a mechanical handle, where the handle together with the bezel cup carrier defines an opening for insertion of one or a plurality of a user's fingers; and lighting to provide different color outputs as a function of: (a) vehicle motion or no vehicle motion; or (b) presence or absence of objects that would impede opening of the vehicle door, wherein the lighting is triggered by user engagement with either the electronic sensor or the mechanical handle;

wherein the hybrid electronic/mechanical release handle is configured to allow a user to preselect one option from among the following:

programming the vehicle door to open when the user engages with the electronic sensor, except when the electronic sensor is disengaged upon the user rotating the mechanical handle in the range of 20° to 90°; and disabling the electronic sensor thereby limiting the hybrid electronic/mechanical release handle to only allow mechanical opening of the vehicle door.

6. A method of operation of an interior vehicle door handle for a vehicle door having a user programmable, hybrid mechanical/electronic release handle including an electronic sensor in communication with a vehicle controller, wherein said sensor is responsive to touch or proximity of a user, including a door release system to implement door opening in communication with said electronic sensor and mechanical handle, comprising:

the user preselecting from:

programming the vehicle door to open when the user engages with the electronic sensor, except when the electronic sensor is disengaged upon the user rotating the mechanical handle in the range of 20° to 90°; and disabling the electronic sensor thereby limiting the hybrid electronic/mechanical release handle to only allow mechanical opening of the vehicle door;

opening said interior vehicle door by performing at least one of:

detecting touch or proximity of a user by said sensor to generate an opening signal and forwarding of said signal to said door release system to open said interior vehicle door; and detecting mechanical operation of said release handle and mechanically opening said interior vehicle door; and activating lighting in response to either detecting touch or proximity by the user or to detecting mechanical operation of the release handle, wherein the lighting provides different color output as a function of: (a) vehicle motion or no vehicle motion; or (b) the presence or absence of objects that would impede opening of the vehicle door.

7. The method of claim 6 further including one or more object sensors in communication with said hybrid mechanical/electronic release handle and detecting one or more objects that would impede opening of said vehicle door.

* * * * *